April 3, 1962 J. T. WALLMARK 3,028,500
PHOTOELECTRIC APPARATUS
Filed Aug. 24, 1956 5 Sheets-Sheet 1

INVENTOR.
JOHN TORKEL WALLMARK
BY
ATTORNEY

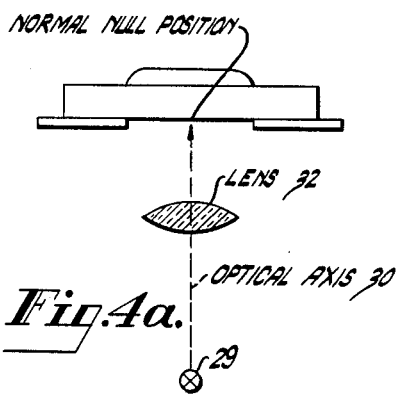
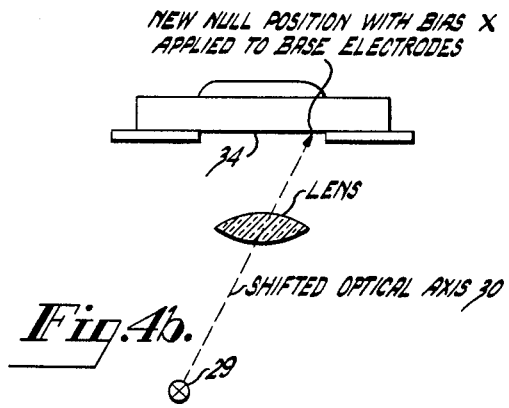
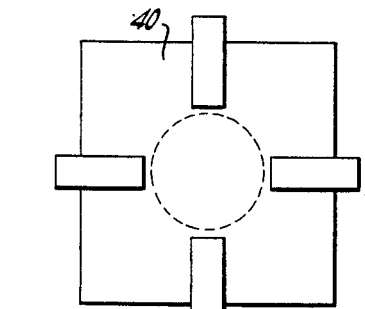
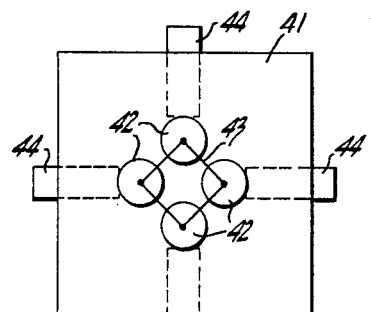
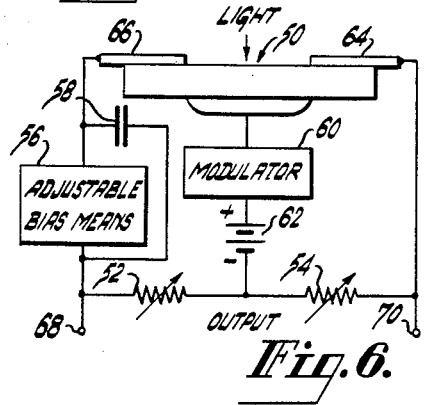
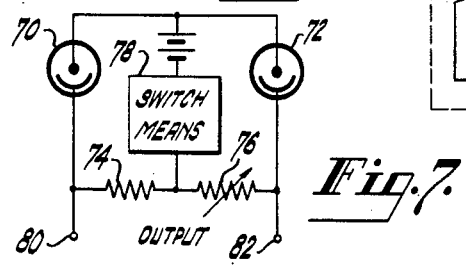
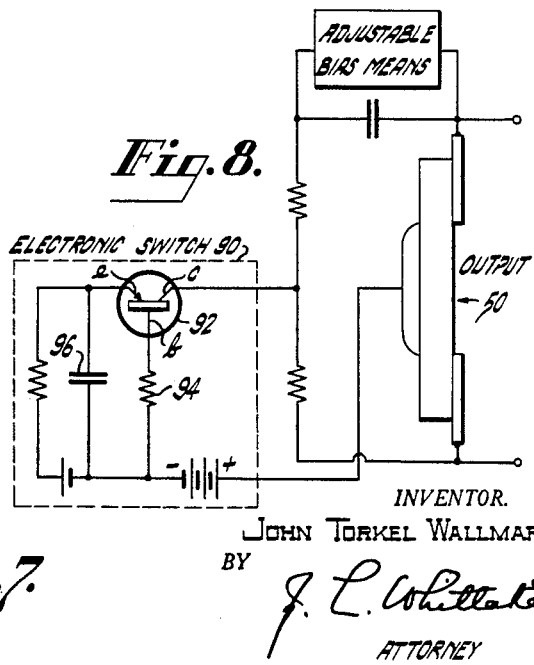
INVENTOR.
JOHN TORKEL WALLMARK

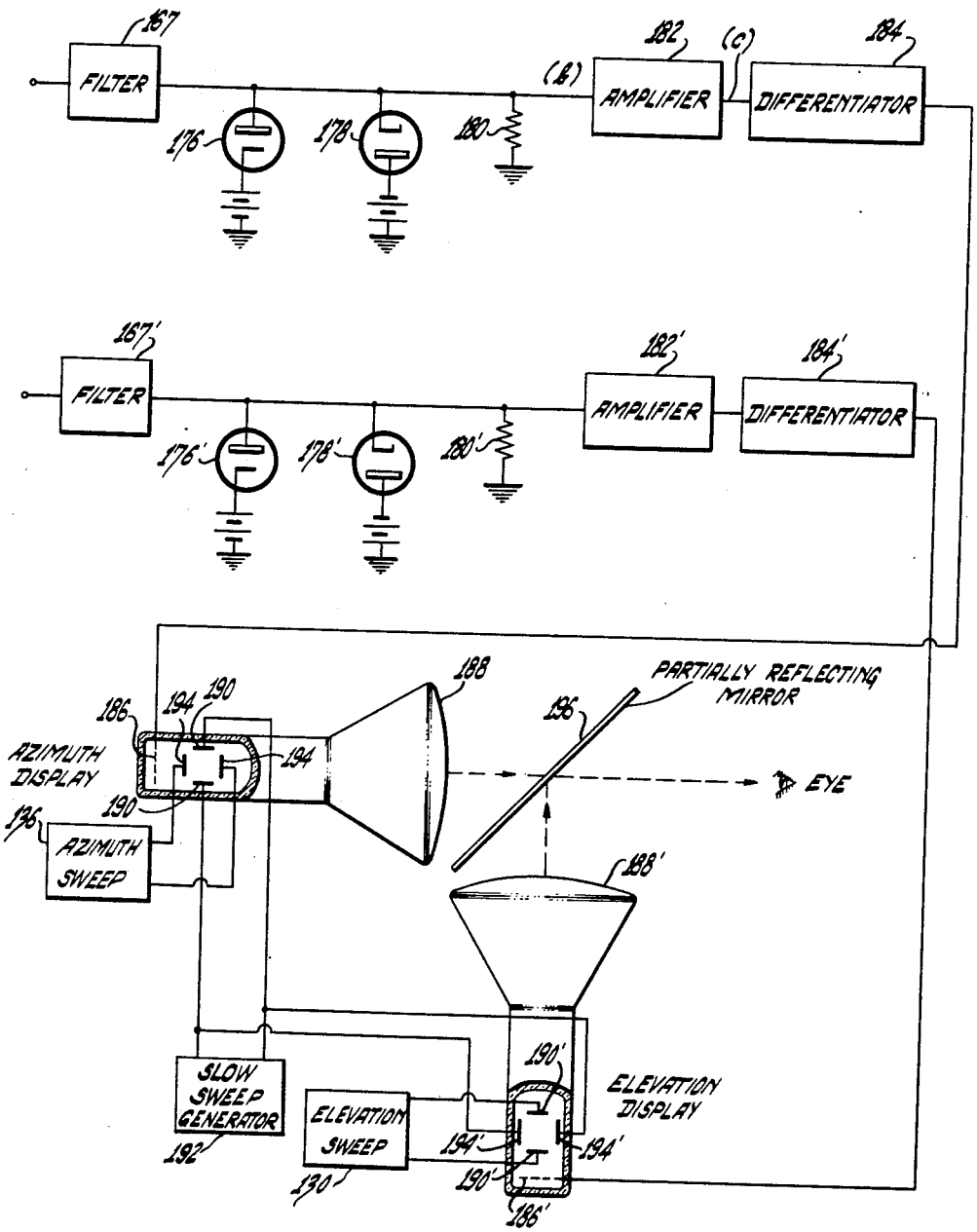

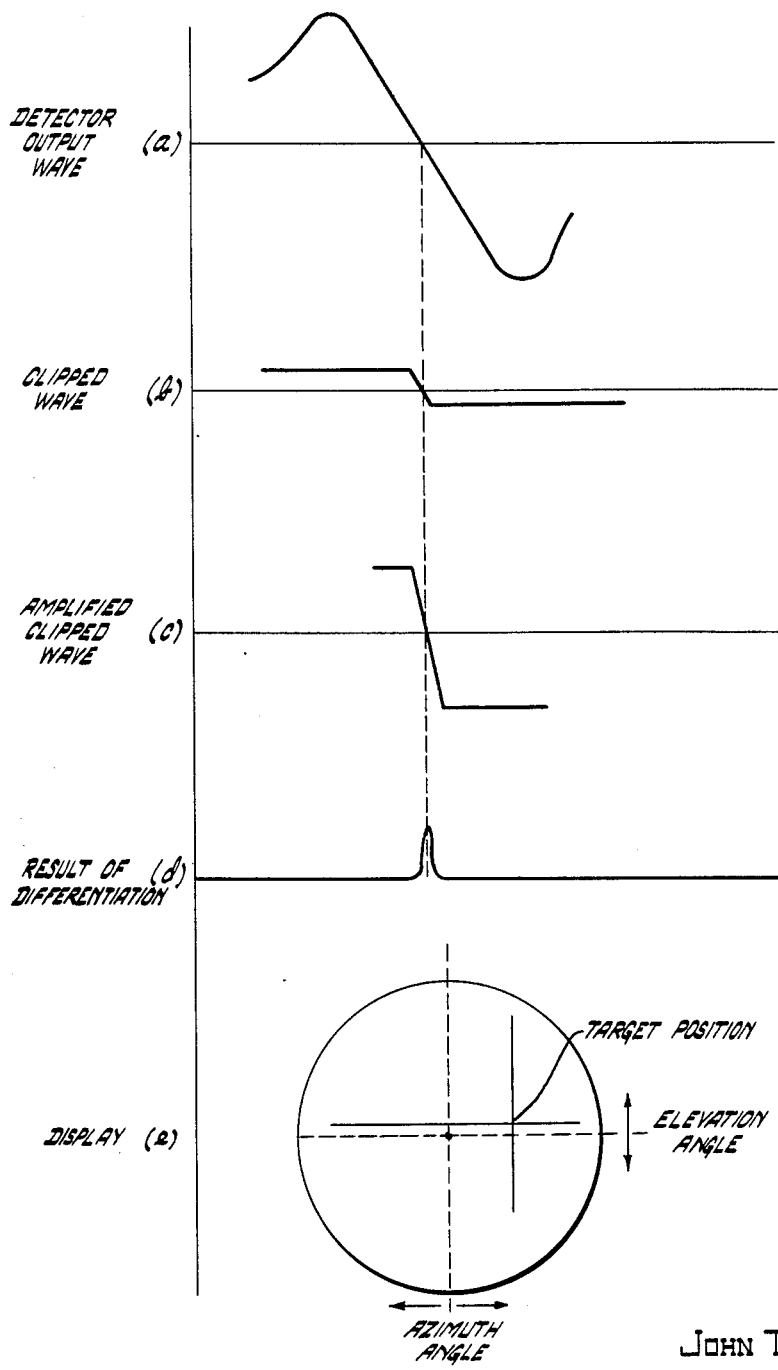

United States Patent Office 3,028,500
Patented Apr. 3, 1962

3,028,500
PHOTOELECTRIC APPARATUS
John Torkel Wallmark, Princeton, N.J., assignor to Radio
Corporation of America, a corporation of Delaware
Filed Aug. 24, 1956, Ser. No. 606,149
17 Claims. (Cl. 250—211)

The present invention relates generally to improved light detector devices and circuits and to improved position-detection systems including light detector devices and circuits.

Semiconductor junction devices are known which, in response to light excitation, produce a photovoltage. Such devices are described, for example, in Patent No. 2,402,662, issued to R. S. Ohl on June 25, 1946. In the devices described in this patent, light striking the photocell induces a photovoltage along the coordinate of the cell transverse to the junction. When light strikes a center portion of the cell, the photovoltage output is zero, and when the light moves away from this center portion, the photovoltage output increases in a sense and amplitude which are functions of the direction and extent of the movement of the light, within limits.

An object of this invention is to provide an improved photovoltaic cell which develops a photovoltage along a dimension of the cell parallel to rather than transverse to the junction and which includes means for shifting the light responsive portion of the cell which produces minimum or zero photovoltage.

Another object of this invention is to provide an improved photocell which produces outputs indicative of two coodinates of a position of a source of light illuminating the photocell.

Yet another object of this invention is to provide an electronic means for sweeping the light response characteristic of a photocell along one or more coordinates of a surface of the photocell.

Still another object of this invention is to provide an improved means for converting the direct voltage output of a photocell to an alternating voltage.

Another object of this invention is to provide an improved and greatly simplified position-determining electronic system employing the photoelectric cell of this invention.

The photocell of this invention includes a semiconductor body (also termed a base layer or wafer) having one or more junctions and at least a pair of electrodes electrically connected to the body. The term junction, as used herein, is generic to an interface between two regions of different impurity concentrations, or two regions of different conductivity type. The junction may be a diffused, alloyed, surface barrier or metal semiconductor junction and may be a rectifying or non-rectifying junction. The light response characteristic of the photocell, which includes a positive voltage branch, a negative voltage branch and a point of zero voltage, is shifted by applying a bias voltage between the electrodes. The direction and extent of the shift in the characteristic are functions of the magnitude and polarity of the applied bias voltage. In a form of the invention especially suitable for the detection of a short flash of light, the bias means may consist of a sawtooth wave generator for successively sweeping the light responsive characteristic along one or more coordinates of the surface of the photocell respective of light.

The form of the inventoin which can detect two coordinates of the position of a source of light includes a semiconductor body having one or more junctions and three or more (preferably four) spaced electrodes in ohmic contact with the body. With this form of the invention, a bias voltage applied to one pair of electrodes shifts the response curve along one coordinate of the light responsive surface of the semiconductor device, and a bias voltage applied to another pair of alternate electrodes shifts the light response curve along another coordinate of the device. A position-detection system employing this form of the invention is described in detail below.

It is sometimes desirable to convert the direct current output of a photocell to an alternating or pulsating current. Known systems for accomplishing this include a rotating slotted disc between the source and the photocell. The present invention converts the direct voltage output of the photocell to an alternating voltage by an arrangement which interrupts or modulates the voltage output of the cell due to the light. In a preferred form of the invention, a load impedance having a center tap is connected between the base region electrodes, and the modulating means is connected between the center tap and the other region of the photocell. The modulating means is preferably an electronic switch such as a free-running multivibrator. With this arrangement, the alternating voltage output of the photocell, due to the "chopping" action of the electronic switch, balances out at the load impedance in the absence of a photovoltage output from the photocell. A photovoltage output due to light excitation, however, appears across the load impedance as an alternating voltage.

The invention will be described in greater detail by reference to the following description taken in connection with the accompanying drawing in which:

FIGURE 1b is a plan view of the photocell of FIGURE 1a;

FIGURES 4a and 4b illustrate the effect of applying bias to the semiconductor device of this invention;

FIGURES 5a and 5b are plan views of semiconductor devices with four base electrodes according to this invention;

FIGURES 6, 7 and 8 are schematic drawings of circuits for converting the direct current output of photocells to pulsating or alternating current;

FIGURE 10 is a block and schematic circuit diagram of a modification of the circuit shown in FIGURE 9; and FIGURE 11 illustrates waveforms which are useful in explaining how the embodiment of FIGURE 10 operates.

Throughout the figures similar reference numerals are applied to similar elements.

Figure 1A:
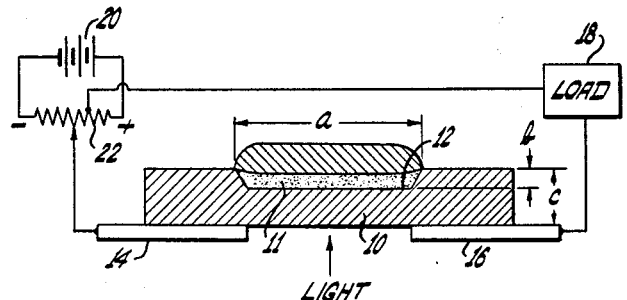
FIGURE 1a is a cross-sectional and schematic view of a semiconductor device and associated circuit according to this invention.
Figure 1B:
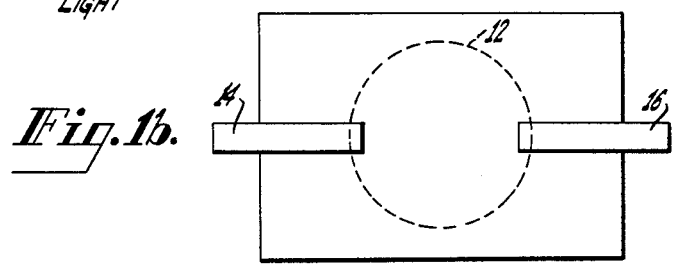

FIGURES 1a and 1b show a photocell consisting of regions 10, 11 of different impurity concentrations or different conductivity types having a junction 12 between them. Region 10 is commonly termed the base layer or wafer. The junction may be a rectifying junction or a non-rectifying junction and may be formed by an alloying or diffusion process. The base layer may consist of germanium, or the like, and the junction may be formed, for example, by alloying a pellet of indium onto the base layer. The junction may be between the following types of regions: n,p; n+,n; or p+,p. However, in the brief discussion which follows, it will be assumed that the junction is between a heavily doped p-type region and a less heavily doped p-type bulk.

Electrodes 14 and 16 are electrically connected at opposite edges of base layer 10. The connections may be ohmic, nearly ohmic, n, or p in character, however, in the discussion which follows, it will be assumed that the connections are ohmic.

Figure 2A:
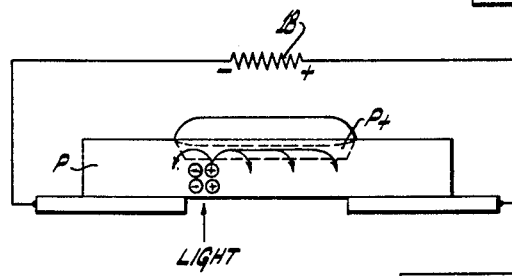
FIGURES 2a and 2b are simplified sketches of the arrangement of FIGURES 1a and 1b to illustrate the theory of operation of the present invention.
Figure 2B:
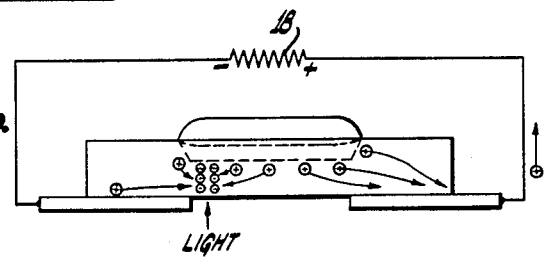

If a beam of light is aimed at the left side of the base layer, as shown in FIGURE 2a, the light injects hole-electron pairs in the germanium. Or, if the light distribution is of greater intensity on the left side of the base layer than on the right side of the layer, the light injects more hole-electron pairs in the left side of the base layer than on the right side of the base layer. The electro-voltaic effect makes the p+ region sweep up most of the holes, while most of the electrons are left in the p region. If, as assumed, the p+ region is heavily doped, its conductance is so large compared to that of the p region that it can be considered an equipotential region, that is, the holes momentarily distribute themselves evenly over the entire p+ region. This means a departure from equilibrium at all points along the junction and as the junction strives to re-establish equilibrium, it reinjects the holes at all points. Now, the situation is as shown in FIGURE 2b. Space charge forces between reinjected holes, and the electrons left behind produce an ohmic current of holes, the majority carriers, back towards the point of injection. In returning, some of the holes find less resistance via the load circuit, shown as resistor 18 in FIGURES 2a and 2b, and produce a "short circuit current" through the resistor of the polarity indicated. In the cell itself, the component of current flow producing the short-circuit current is generally parallel to the junction and is therefore termed a "lateral" photocurrent.

When the light beam strikes the right portion of the base layer, the action above-described causes a current flow through resistor 18 in the opposite direction. When the light beam strikes the center of the base layer, the two resultant short circuit currents cancel, giving substantially zero current through the load circuit. The light response characteristic is of the general shape of one of the curves shown in FIGURE 3, as will be explained more fully below.

In a practical semiconductor device made with a base layer formed of n-type germanium and having a p-type junction, the dimensions were as follows. These are shown in FIGURE 1.

$a = 0.045$ inches
$b = 0.002$ inches
$c = 0.005$ inches

The n-type germanium base had a resistivity of 1–2 ohm cm. and p-type recrystallized region a resistivity of 0.001 ohm cm. The cell was roughly 0.25 inch in length.

Figure 3:
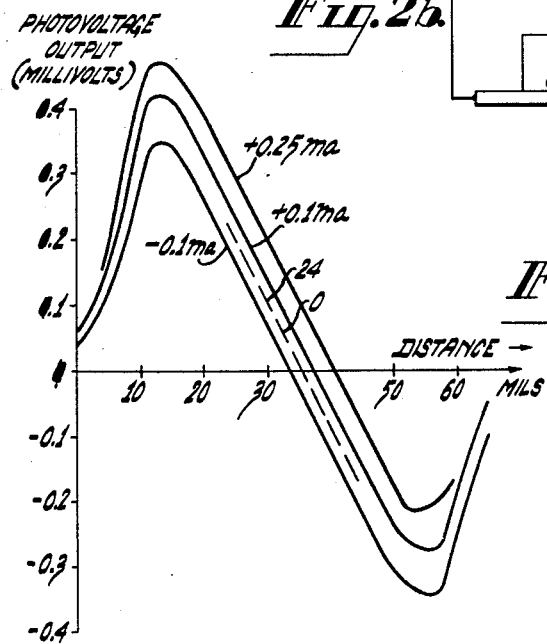
FIGURE 3 is a graph of the light-response characteristic of the photocell of this invention with different bias currents applied.

It has been found possible electronically to shift the light response characteristic of the photocell described above. This is done by applying a bias voltage to the base electrodes 14 and 16 and, for example, by means of the battery 20 and potentiometer 22, shown in FIGURE 1. The effect of applying a bias is shown in FIGURE 3. With no bias current applied, the response characteristic follows the dashed line 24. This line intersects the $x$ axis at about 36 mils. In other words, when light is directed at the center of the cell, corresponding to a reading of 36 mils along an arbitrary scale, there is zero photovoltage output of the cell. As the light is moved from 36 mil position, the photovoltage output increases in a sense and magnitude dependent upon the direction and extent of the movement of the light. If a biasing current of $-0.1$ milliampere is applied to electrodes 14 and 16, the response curve is shifted to the left as is the point of intersection of the curve with the $x$ axis. With biasing currents of 0.1 milliampere and 0.25 milliampere, respectively, the response curve is shifted to the right, as shown in FIGURE 3.

The linearity of the sweep, that is, the shift of the curve per unit of applied biasing current is quite good. Also, as can be seen from FIGURE 3, the linearity of the response characteristic, as a function of the displacement of a light spot from the position on the base electrode of minimum light sensitivity, is also quite good.

The shifting of the sensitivity curve by the electronic means described is the electronic equivalent of the mechanical rotation of the photocell about a center axis. This is illustrated in FIGURES 4a and 4b. With no bias voltage applied, a source of light on optical axis 30 is focused by an optical system shown as a single lens 32 onto the center or null position of the photocell. This is shown in FIGURE 4a. With a bias voltage applied to the base electrodes the position on the cell of null response is shifted an amount and in a direction dependent on the magnitude and sense of the bias voltage. The effect in the shift in the null position is to shift the optical axis 30, as illustrated in FIGURE 4b.

A practical cell has been built according to this invention which can detect the position of a light spot to less than 100 A°. It has been found possible to measure motion of less than 0.1 second of arc using the cell with a lens or aperture. The linearity of the response characteristic is better than 1.5 percent over a distance of .03 inch. The sensitivity of the cell is approximately 200 microamperes per lumen, and its frequency response is about the same as that of junction transistors.

A preferred type of photocell construction is shown in FIGURE 5a. This cell is like the one of FIGURE 1 except that four rather than two base electrodes are employed. A cell of this type is capable of producing two photovoltage outputs. One of the outputs is indicative of the position of a spot of light along one coordinate of surface 40 of the base, and the other output is indicative of the position of a spot of light along another coordinate of surface 40. A use for this form of the invention is described in greater detail below.

In the device shown in FIGURE 5a, the electrodes are spaced from the edge of the junction. In other words, if the electrodes and junction were in the same plane, they would not touch. In the device of FIGURE 1, however, the inner ends of the electrodes slightly overlap the edges of the junction. It has been found that both constructions give good results and that the spacing between electrode ends or between the edge of the junction and the ends of the electrodes is not critical.

It is desirable, in certain cases, to increase the area of the light receiving surface of the photocell. However, when this is done, the size of the junction must also be increased. Practical manufacturing reasons may make this impossible or, at best, very difficult above a given limit. The problem may be overcome, however, by dividing the junction into 2, 3 or more separate junctions interconnected by a conductor. A four electrode form of a cell of this type is shown in FIGURE 5b. It includes a base layer 41 with four pellets 42 alloyed into a surface of the base layer. Other means of forming the junctions are possible. The base layer may be germanium and the pellets indium. The pellets are interconnected by conductive lead 43. The electrodes 44 are symmetrically spaced relative to a point about which the pellets are symmetrically arranged. Photocells with 2, 3 or more than 4 electrodes may also be made with more than one junction.

The photocell of FIGURE 5b may be several times the size of the one of FIGURE 5a. (The two figures are drawn to different scales.) Note also that FIGURE 5a is a bottom view, whereas FIGURE 5b is a top view.

When a bias voltage is applied to the base electrodes in order to sweep the light response characteristic of the photocell, this bias voltage itself interacts with the photovoltage output of the cell. It is therefore necessary to convert the cell output to an alternating current in order to eliminate the interfering bias voltage. Conventional "chopping" methods include a rotating disc between the source of light and the photocell. According to this invention, the conversion to alternating current is preferably via an all electronic chopper.

Referring to FIGURE 6, the output of photocell 50 develops a voltage across the load impedance—a pair of resistors 52, 54 of equal value. One or both of the resistors may be adjustable. The adjustable bias means is shown as a block 56 and may consist of a battery and potentiometer, a sawtooth wave generator, or any other suitable arrangement. The biasing means 56 is by-passed for A.C. by a capacitor 58. The modulator 60, which may be a switch, is connected in series between the junction of photocell 50 and the connection between resistors 52 and 54. A battery 62 is connected in series with the modulator in the polarity indicated.

Assume, for purposes of the explanation which follows, that the junction is between a base layer of n-type material and a region of p-type material. Assume also that the modulator is a switch. When the switch is open, photocell 50 operates in its usual manner as described above. When the switch is closed, however, a forward voltage is applied to the junction, and a resistive potential drop in the germanium prevents holes from entering the junction, thereby reducing the photvoltage output of cell 50. It has been found that 5 to 10 milliamperes of forward current is sufficient substantially to eliminate the photovoltage. In operation, when the modulator is a switch, it is driven rapidly and continuously from open to closed position and vice versa.

The alternating current output of the photocell due to the chopping action of the modulator 60 passes from electrode 64 through resistors 54, 52 in one direction, and from electrode 66 through resistors 52, 54 in the opposite direction. If the photocell circuit is balanced, the two currents cancel in the absence of a light induced current, and no alternating current appears at terminals 68, 70. Balance may be achieved by adjusting resistor 54 or 52.

The bias current may be separated from the light induced current by means of a filter, and associated circuits, as explained below.

A more conventional photocell arrangement such as illustrated in FIGURE 7 may also employ the chopping means described in connection with FIGURE 6. In the conventional arrangement, there are a pair of phototubes 70, 72. The load impedance consists of a pair of resistors 74, 76. Modulator 78 located in a branch common to both photocells may comprise a multivibrator, sine wave oscillator, or the like. As in the arrangement of FIGURE 6, when the circuit is balanced, the alternating current outputs of the two phototubes cancel and do not appear at output terminals 80, 82. To compensate for circuit or tube differences, one or both of resistors 76, 74 may be made variable. Also, in certain circumstances, an impedance can be substituted for one of the phototubes. Again, the impedance may consist of a variable resistor.

FIGURE 8 illustrates a preferred form of chopper or modulator which may be used in the circuit of FIGURE 6. It consists of a transistor relaxation oscillator 90. The oscillator includes a transistor 92 having a base load resistor 94, a storage capacitor 96 and a collector load impedance consisting of the photocell circuit. The relaxation oscillator itself is conventional and similar to the one shown on page 396 of the book, "Transistor Electronics" by Lowe, Endres et al. The mode of operation of the oscillator is described in the book, in the text accompanying FIGURES 16–22. It will be appreciated, of course, that other types of oscillators or switches may be employed instead.

Figure 9:
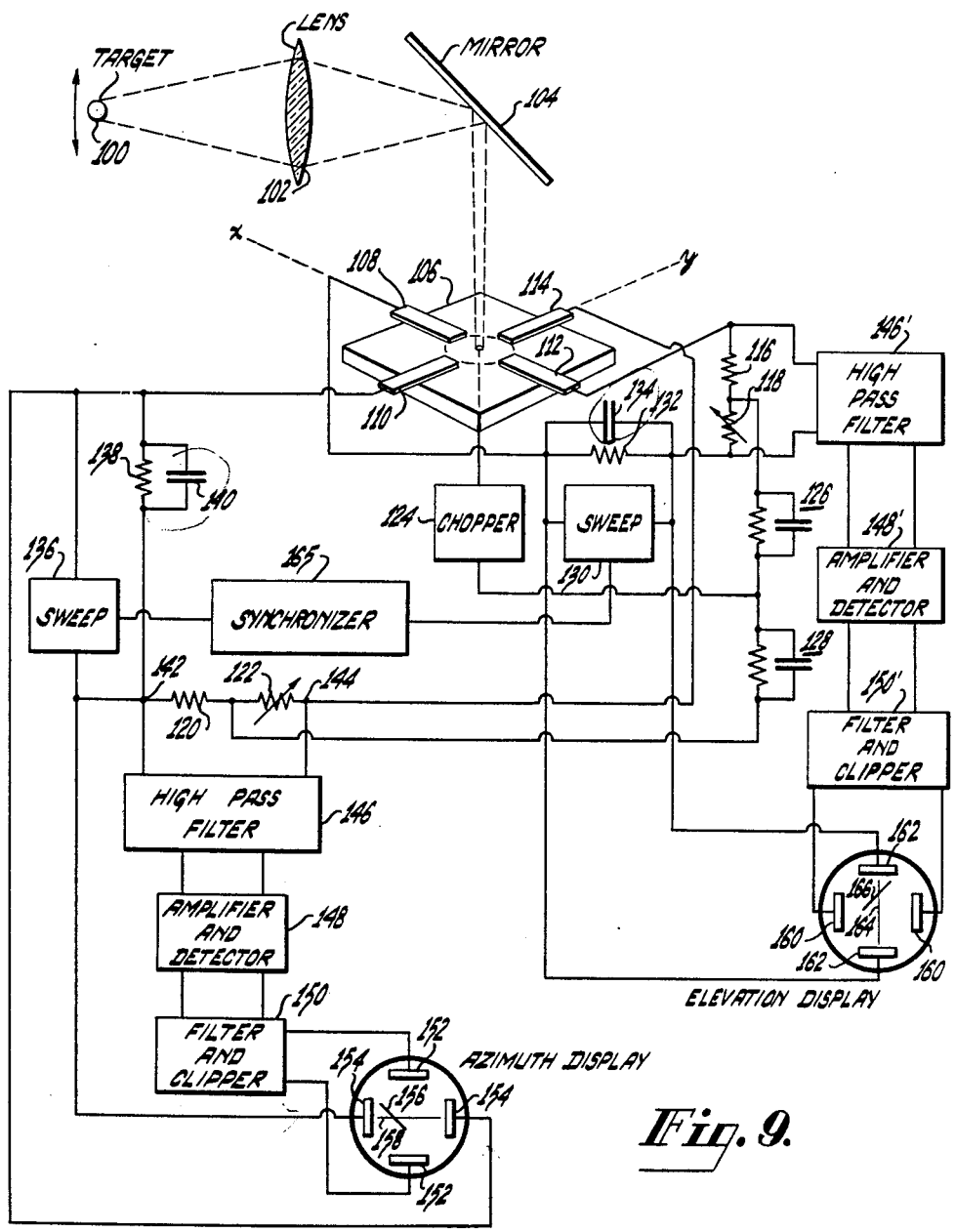
FIGURE 9 is a block circuit diagram of a system for determining the position of a target.

FIGURE 9 illustrates a position-determining system which includes a photocell like the one shown in FIGURE 5. Light from the source 100 passes through an optical system shown schematically as a single lens 102 and mirror 104 and onto the light receiving surface of photocell 106. This cell has a center null position.

In other words, in the absence of bias voltage applied to base electrodes 108, 110, 112 and 114, the optical axis of the associated optical system passes through the center of the photocell and the center of the lens. The load circuit of electrodes 108, 112 include resistors 116 and 118 of equal value. The load circuit of base electrodes 110, 114 includes load resistors 120 and 122 of equal value. The means for converting the direct current output of the photocell to alternating current consist of a chopper 124 connected in series with the junction. The chopper is connected to the junction of resistors 116 and 118 by isolating impedances 126 and to the junction of resistors 120 and 122 isolating impedances 128. In certain forms of the invention, isolating impedances 126 and 128 may be omitted.

The light response characteristic of the photocell is periodically swept across the $x$ and $y$ coordinates of the light receiving surface of the photocell. A sawtooth wave generator 130 applies a sawtooth wave across resistor 132 for sweeping the response curve along the $x$ coordinate. Capacitor 134 is a by-passing capacitor for the alternating current output of the photocell resulting from the action of chopper 124. In like manner, sawtooth generator 136 applies its sweep across resistor 138 for sweeping the response curve along the $y$ coordinate of the photocell. Capacitor 140 is a by-passing capacitor.

The output of the $y$ section of the photocell, which may correspond to the azimuth of a target being tracked, is taken from terminals 142, 144. The photocell and associated circuits are balanced so that no alternating current voltage appears across terminals 142, 144 in the absence of a light induced current. When light does strike the cell, an alternating current is developed across terminals 142, 144 which is amplitude modulated in accordance with the photovoltage output of the cell. The alternating current frequency is much higher than that of the sawtooth frequency and may be separated therefrom by passing the wave through a high-pass filter circuit 146. The filter circuit 146 may include means blanking the retract interval of the sweep in order further to discriminate against the higher frequency sweep components, however, this is not essential. The output of filter 146 is then passed through an amplifier and detector 148, and if required, a low pass filter and clipper 150. The clipper portion of block 150 may be similar to circuit 176, 178 of FIGURE 10. The resultant signal is applied to the vertical deflection plates 152 of a cathode ray tube indicator. The sawtooth sweep output of generator 136 is applied to the horizontal deflection plates 154 of the indicator. The resultant display will be somewhat as indicated by wave 156. A horizontal line 158 may be etched on the face of the indicator in the position shown, and the intersection of wave 156 with the horizontal line is indicative of the position, along the $y$ coordinate on the light receiving surface of the photocell, of the point of minimum response of the photocell.

Stages 146', 148' and 150' are analogous to the like numbered components in the other channel. These stages receive the output signal of base electrodes 108, 112— the electrodes which produce an output indicative of a position along the $x$ coordinate of the surface of photocell 106. The output signal of stage 150' is applied to the horizontal deflection plates 160 of a second oscilloscope. The sweep voltage output of generator 130 is applied to the vertical deflection plates 162 of the second oscilloscope. A line 164 is etched on the oscilloscope screen, and the intersection of wave 166 with this line is indicative of the position of a light spot on the light receiving surface of cell 106 along the $x$ coordinate of the surface.

In a preferred form of the invention sweep generators 136 and 130 operate at the same frequency and in synchronism. Also, during the time one sweeps the other is cut-off. This type of operation may be achieved by alternately applying sweep triggering pulses to the generators from synchronizer 165.

An improved version of the circuit of FIGURE 9 is illustrated in part in FIGURE 10. Here, there is a simultaneous display on a single screen of two coordinates of a position. The output wave of filter 167 (the filter in block 150 of FIGURE 9), shown in FIGURE 11a, is applied to a pair of oppositely connected, biased diodes 176, 178. These function to clip the top and bottom portions of the wave and to produce across resistor 180 the signal shown in FIGURE 11b. This signal passes through zero, which corresponds to the null portion of the light response characteristic of the photocell. The signal of FIGURE 11b is amplified in stage 182 to produce the wave shown in FIGURE 11c, and the latter is differentiated by differentiator circuit 184. The resultant signal, shown in FIGURE 11d, is a pulse which occurs in time coincidence with the point at which the wave of FIGURE 11a passes through zero volts. This pulse is applied to the control grid 186 of oscilloscope 188. The azimuth sweep voltage from generator 136 (see also FIGURE 9) is applied to the horizontal deflection plates 194 of oscilloscope 188. A sweep at a rate much lower than that of azimuth sweep 136 is applied from generator 192 to the vertical deflection plates 190 of the oscilloscope.

Filter 167' is the filter in stage 150' of FIGURE 9. Diodes 176' and 178', amplifier 182' and differentiator 184' operate similarly to the like numbered components described in the preceding paragraph. The output signal of differentiator 184' is a pulse d' coincident with the zero point on wave 166 (see the lower right portion of FIGURE 9). It is applied to the control grid 186' of oscilloscope 188'. The slow sweep output of generator 192 is applied to the horizontal deflection plates 194' of oscilloscope 188' and the relatively fast, elevation sweep output of generator 130 is applied to the vertical deflection plates 190' of oscilloscope 188'.

Mirror 196 partially reflects and partially passes incident light. The display on the mirror is as shown in FIGURE 11e. It consists of two perpendicular lines, one indicative of the y position of the target (azimuth), and the other indicative of the x position of the target (elevation). The point at which the two lines intersect is indicative of the target position.

In another form of the invention similar to the one shown in FIGURE 10, all information may be displayed on a single cathode ray tube. In this form of the invention one of the sweep generators 130, 136 produce a sawtooth wave at a frequency substantially slower than that produced by the other generator. Either generator may be the slow sweep generator. In either case, the sawtooth output of one of the generators is applied to the vertical deflection means of the cathode ray tube and the other to the horizontal deflection means. The outputs of differentiators 184 and 184' are applied, preferably through a coupler stage, to the indicator. Slow sweep generator 192 shown in FIGURE 10 may be dispensed with as may the reflecting mirror 196. The display on the screen of the single cathode ray tube is similar to the one shown in FIGURE 11e.

What is claimed is:

1. A light responsive semiconductor device including a base layer and a junction for producing a photovoltage along a dimension of said device generally parallel to said junction, said photovoltage having a minimum value when the light strikes a given portion of said device, and increasing in value in one sense when the light moves from said given portion in one direction, and increasing in value in an opposite sense when the light moves from said junction in the opposite direction; a pair of electrodes in electrical contact with said base layer; and a pulse wave generator coupled to said base electrodes for applying an adjustable bias voltage across said electrodes.

2. A light responsive semiconductor device including a base layer and a junction for producing a photovoltage along a dimension of said device generally parallel to said junction, said photovoltage having a minimum value when the light strikes a given portion of said device, and increasing in value in one sense when the light moves from said given portion in one direction, and increasing in value in an opposite sense when the light moves from said junction in the opposite direction; a pair of electrodes in electrical contact with said base layer at opposite edges thereof; and a sawtooth wave generator connected to said electrodes for applying a sawtooth sweep voltage across said electrodes.

3. A light responsive semiconductor device including a base layer of one conductivity type of generally rectangular configuration and a region of another conductivity type at the center of the rectangle, a junction between said layer and said region, and four electrodes in ohmic contact with said base layer at the outer edges thereof, within a diffusion length for minority carriers of said junction, and spaced symmetrically with respect to said region of another conductivity type.

4. A semiconductor device responsive to light comprising a region of one conductivity characteristic, a region of another conductivity characteristic and a junction between said two regions, said device producing a light responsive voltage along a dimension thereof generally parallel to said junction; a pair of base electrodes in electrical contact with one of said regions and spaced symmetrically with respect to said junction; a load impedance connected between said electrodes, said load impedance having a center tap; and modulating means connected between said center tap and the other of said regions.

5. The invention as set forth in claim 4, wherein said modulating means comprises an oscillator.

6. The invention as set forth in claim 4, wherein said modulating means comprises a relaxation oscillator.

7. A light responsive semiconductor device including a base region of one conductivity characteristic having a pair of opposite faces, a region of another conductivity characteristic in electrical contact with one of said faces, and a junction between said two regions, four electrodes in electrical contact with one of said faces and symmetrically spaced about said junction, a load circuit connected across one pair of alternate electrodes, a load circuit connected across another pair of alternate electrodes, and means connected to said load circuits for simultaneously indicating the voltages across said load circuits.

8. A light responsive semiconductor device including a base region, another region and a junction adapted to produce a photovoltage thereacross between said regions, four electrodes in electrical contact with said base and spaced about said junction, means coupled to one pair of alternate electrodes for applying an adjustable vias voltage thereacross, and means coupled to the other pair of alternate electrodes for applying an adjustable bias voltage thereacross.

9. A light responsive semiconductor device including a base region of one conductivity type having a pair of opposite faces, a region of another conductivity type at the center of one of said faces, and a junction between said regions, four electrodes in electrical contact with one of said faces at the edge portions thereof and symmetrically spaced about said junction, adjustable bias means connected to one pair of alternate electrodes for applying an adjustable bias voltage thereacross, and adjustable bias means connected across the other pair of alternate electrodes for applying an adjustable bias voltage thereacross.

10. A light responsive semiconductor device including a base region, another region and a junction between said regions, and responsive to light for producing a photovoltage along a dimension of said device generally parallel to said junction; a pair of spaced base electrodes in electrical contact with said base region on opposite sides of said junction; a load impedance connected between said electrodes; and means connected between a point on said load impedance between its ends and said junction for intermittently causing said semiconductor device to produce a reduced photovoltage in response to light.

11. The invention as set forth in claim 10, wherein said means comprises a multivibrator.

12. A light detector system comprising, in combination, a light responsive semiconductor device including a base region having a pair of opposite faces, another region at the center of one of said faces, and a junction between said regions, the other of said faces serving as the light receiving surface of said device, and four electrodes in electrical contact with one of said faces at the edge portion thereof and symmetrically spaced about said junction; means for focusing light from an object of interest onto the light receiving surface of said device; a load impedance connected across one pair of alternate electrodes; a load impedance connetced across the other pair of alternate electrodes; adjustable bias means in circuit with one pair of electrodes; adjustable bias means in circuit with the other pair of alternate electrodes; and indicator means coupled to said load impedances for simultaneously displaying the photovoltages developed across said load impedances.

13. A semiconductor device responsive to light comprising a region of one conductivity characteristic, a region of another conductivity characteristic, and a junction between said two regions, said device producing a light responsive voltage along a dimension thereof generally parallel to said junction; a pair of base electrodes in electrical contact with one of said regions and spaced symmetrically with respect to said junction; a load impedance connected between said electrodes, said load impedance having a center tap; modulating means connected between said center tap and the other of said regions; and adjustable biasing means connected between said base electrodes.

14. A semiconductor device comprising a semiconductor body having a surface including a high resistivity region adjacent a surface of said body, at least one low resistivity region adjacent said high resistivity region, and a junction therebetween, said junction being substantially parallel to and within about a diffusion length for minority charge carriers of said surface; and at least two electrodes contacting said high resistivity region and being also spaced from but within about a diffusion length for minority charge carriers of said junction.

15. A light responsive device including a body comprising a light receiving surface, a high resistivity semiconductor region adjacent said surface, a low resistivity semiconductor region, and a junction between said high resistivity region at said surface and said low resistivity region, said junction being substantially parallel to said surface and within about a diffusion length for minority carriers of said surface; and at least two spaced ohmic electrodes in electrical contact with said high resistivity layer and within about a diffusion length for minority charge carriers of said junction.

16. The device of claim 15 including two ohmic electrodes contacting said surface and symmetrically spaced around said junction.

17. The device of claim 15 including four ohmic electrodes contacting said surface at the edge portions thereof and symmetrically spaced about said junction.

References Cited in the file of this patent

UNITED STATES PATENTS

| | | |
|---|---|---|
| 2,560,606 | Shive | July 17, 1951 |
| 2,570,978 | Pfann | Oct. 9, 1951 |
| 2,582,850 | Rose | Jan. 15, 1952 |
| 2,641,713 | Shive | June 9, 1953 |
| 2,650,311 | Bray et al. | Aug. 25, 1953 |
| 2,709,232 | Thedieck | May 24, 1955 |
| 2,740,901 | Graham | Apr. 3, 1956 |
| 2,779,877 | Lehovec | Jan. 29, 1957 |
| 2,794,863 | Van Roosbroeck | June 4, 1957 |
| 2,800,617 | Pankove | July 23, 1957 |
| 2,846,592 | Rutz | Aug. 5, 1958 |
| 2,863,056 | Pankove | Dec. 2, 1958 |
| 2,879,405 | Pankove | Mar. 24, 1959 |
| 2,889,499 | Rutz | June 2, 1959 |
| 2,907,934 | Engel | Oct. 6, 1959 |

OTHER REFERENCES

A. R. Moore et al.: Proceedings of the I.R.E., vol. 43; April 1955, pp. 427–435.